(12) United States Patent
Kumar (10) Patent No.: US 7,533,146 B1
(45) Date of Patent: May 12, 2009

(54) SHARED WEB BROWSER APPARATUS AND METHOD FOR INTERACTIVE COMMUNICATIONS

(75) Inventor: Manu Kumar, Pittsbusrgh, PA (US)

(73) Assignee: Epiphany, Inc., San Mateo, CA (US)

( * ) Notice: Subject to any disclaimer, the term of this patent is extended or adjusted under 35 U.S.C. 154(b) by 492 days.

(21) Appl. No.: 09/592,309

(22) Filed: Jun. 13, 2000

Related U.S. Application Data (60) Provisional application No. 60/139,430, filed on Jun. 14, 1999.

(51) Int. Cl.
G06F 15/16 (2006.01)

(52) U.S. Cl. .................. 709/205; 709/203; 709/204; 709/217; 709/218; 709/219; 709/227; 709/228; 709/229; 709/248; 715/733; 707/E17.111

(58) Field of Classification Search ......... 709/203–204, 709/217–219, 223–224, 227–229, 205, 248; 715/733; 707/E17.111
See application file for complete search history.

(56) References Cited

U.S. PATENT DOCUMENTS

| | | | | |
|---|---|---|---|---|
| 5,724,508 A | * | 3/1998 | Harple et al. | 709/205 |
| 5,758,079 A | * | 5/1998 | Ludwig et al. | 709/204 |
| 5,768,528 A | | 6/1998 | Stumm | |
| 5,802,294 A | * | 9/1998 | Ludwig et al. | 709/204 |
| 5,862,330 A | * | 1/1999 | Anupam et al. | 709/204 |
| 5,884,039 A | * | 3/1999 | Ludwig et al. | 709/227 |
| 5,894,305 A | * | 4/1999 | Needham | 715/733 |
| 5,944,791 A | | 8/1999 | Scherpbier | |
| 6,020,885 A | * | 2/2000 | Honda | 715/757 |
| 6,070,185 A | * | 5/2000 | Anupam et al. | 709/204 |
| 6,088,719 A | * | 7/2000 | Murakami | 709/204 |
| 6,101,532 A | * | 8/2000 | Horibe et al. | 709/206 |
| 6,108,687 A | * | 8/2000 | Craig | 709/204 |
| 6,144,991 A | * | 11/2000 | England | 709/205 |

(Continued)

FOREIGN PATENT DOCUMENTS

| | | | |
|---|---|---|---|
| EP | 1022664 A2 | * | 7/2000 |
| WO | WO 97/37484 | * | 10/1997 |

OTHER PUBLICATIONS

Rutledge, P; and Mucciolo, T. "Special Edition Using Microsoft Powerpoing Presentation 2000." Chapter 17: Using Online Broadcasts and Meetings, Macmilan Computer Publishing, Mar. 1999.*

*Primary Examiner*—Alina N. Boutah
(74) *Attorney, Agent, or Firm*—Blank Rome LLP (57) ABSTRACT

A shared web browser for simultaneously linking together a plurality of remote locations to deliver live presentations to anyone, anywhere in the world. The web browser can be used either by itself, or in conjunction with a conventional telephone conference call. A personal computer at each location is linked together by means of an Internet connection, wherein one of those computers controls the information displayed on each of the other computers; this is the presenter's function. Each of the other users or participants are referred to as attendees, and the presenter directs information to be displayed on the monitors of all the participants in the conference. The shared web browser of the present invention works within conventional Internet browsers, eliminating the need for the purchase of or training in the use of expensive video conferencing equipment.

25 Claims, 5 Drawing Sheets

U.S. PATENT DOCUMENTS

| | | | |
|---|---|---|---|
| 6,151,621 A * | 11/2000 | Colyer et al. | 709/204 |
| 6,155,840 A * | 12/2000 | Sallette | 709/204 |
| 6,192,394 B1 * | 2/2001 | Gutfreund et al. | 709/204 |
| 6,192,398 B1 * | 2/2001 | Hunt | 709/213 |
| 6,195,091 B1 * | 2/2001 | Harple et al. | 715/751 |
| 6,240,444 B1 * | 5/2001 | Fin et al. | 709/205 |
| 6,317,777 B1 * | 11/2001 | Skarbo et al. | 709/204 |
| 6,339,754 B1 * | 1/2002 | Flanagan et al. | 704/2 |
| 6,353,446 B1 * | 3/2002 | Vaughn et al. | 715/733 |
| 6,381,640 B1 * | 4/2002 | Beck et al. | 709/223 |
| 6,411,989 B1 * | 6/2002 | Anupam et al. | 709/204 |
| 6,463,460 B1 * | 10/2002 | Simonoff | 709/203 |
| 6,519,628 B1 * | 2/2003 | Locascio | 709/204 |
| 6,560,707 B2 * | 5/2003 | Curtis et al. | 713/163 |
| 6,571,234 B1 * | 5/2003 | Knight et al. | 707/3 |
| 6,577,328 B2 * | 6/2003 | Matsuda et al. | 715/757 |
| 6,611,822 B1 * | 8/2003 | Beams et al. | 706/11 |
| 6,628,767 B1 * | 9/2003 | Wellner et al. | 379/202.01 |
| 2002/0016788 A1 * | 2/2002 | Burridge | 709/204 |
| 2002/0016861 A1 * | 2/2002 | Simonoff | 709/250 |
| 2002/0073152 A1 * | 6/2002 | Andrew et al. | 709/204 |

* cited by examiner

SHARED WEB BROWSER APPARATUS AND METHOD FOR INTERACTIVE COMMUNICATIONS

This application is related to provisional application Ser. No. 60/139,430 which was filed on Jun. 14, 1999.

BACKGROUND OF THE INVENTION

1. Field of the Invention

The invention relates to a system for conferencing people located in a plurality of remote locations, and more particularly to a shared web browser for collaborating with multiple parties in an Internet-based conference.

2. Description of the Prior Art

In today's business world it is not uncommon for multiple parties to be simultaneously engaged in a meeting, while all the parties are not at the same location. Modern technology allows people to work together even though they may be located in different offices within a building complex, across town, across the state, across the country or even around the globe.

Typically, this can occur by means of a telephone conference call wherein numerous parties from these differing locations can be interconnected by means of the phone lines so that each party is able to simultaneously converse with the other parties, even though they are in separate locations. The call can either be initiated by one party who then calls all the other parties, or by a central operator, such as one employed by the telephone company, who then individually calls each party to bring them into the conference or "meeting". By itself, phone conferences offer no way to present any visual data. Even if slides are electronically transmitted beforehand, such as by email, there can be no direct control over what the attendees are viewing at any given time, not to mention the hassles of attendees opening presentations with different versions of software, or not having the software at all.

If it is desired for the people in the individual locations to be able to see the people with whom they are "meeting", a process known as video conferencing can also be available. In addition to the conference call which takes place over the phone lines, video capabilities are also provided. A video camera is positioned so as to view the persons attending the meeting at one location and transmits that image to monitors or televisions which are also available at each of the individual locations. However, it is required that a television monitor be provided for each of the different locations so that a party in one location can view all the people in the differing locations. Thus, for example, if people are meeting in four different locations in a video conferencing mode, each office must have three televisions so as to view all the people in each location. This adds to the complexity and cost of a traditional conference call and also requires numerous hardwiring and other infrastructure support in order to be able to accommodate the electronic equipment necessary for interconnecting the different locations. Video conferencing requires an enormous investment. The investment includes both money to acquire and maintain the expensive equipment (over $30,000 in most cases), and valuable time, because all attendees still have to congregate to locations with video conferencing equipment.

An advantage to the video conferencing method is that it allows visual presentations to be made to each of the participants, such as displaying documents, graphs and charts, which one of the parties may want all the other parties to view. However, it is again necessary that at least one of the meeting locations where the presentation is originating from provide the video equipment so as to transmit the images of the documents to the other locations, so that they may be able to view the presentation simultaneously during the meeting. While it may also be possible to send hard copies of each of these documents or presentations to the other locations, such as by mail or facsimile, such documents must be prepared well in advance, nor does this method allow for real-time updating of those documents during the course of the presentation.

In more recent years, the use of the Internet, or World Wide Web, has allowed people all over the world to access documents generally located in one location on the web, such as on a particular web server. A person in one state, for example, may log on to a website, which may have originated from a company across the country in another state, such that this person is able to obtain access to the information through the use of a personal computer and a telephone connection. All person needs to do is dial into an Internet service provider, such as American On-line®, Compuserve® or AT&T®, and access the particular website on the Internet through a web browser, such as Microsoft Internet Explorer® or Netscape Navigator®. By entering search criteria while in any of these browsers, such as through a search engine on the web, for example, a person can access and find the website that contains that information on whatever topic the research was directed.

What is needed then is a more cost effective manner by which people from differing locations can interact during the course of a meeting so as to view and update documents in a real time basis.

It is therefore an object of the present invention to provide a conferencing mechanism for people located at numerous locations to be brought together through one medium so that generally simultaneous interactive communications can take place during such a meeting.

SUMMARY OF THE INVENTION

The above and other objects are attained by the present invention, according to which, briefly stated, an apparatus for interactive communications over a network among participants at a plurality of locations is provided. The apparatus is comprised of a plurality of individual personal computers operatively connected to the network, each of the plurality of computers including means for receiving and displaying information from the network. One of the plurality of computers includes means for transmitting information to each of the other of plurality of computers over the network, wherein the other computers each generally simultaneously display the same information. Preferably, the network is comprised of a World Wide Web or Internet connection and each of the computers or users is "logged into" a particular website for conducting the interactive communications. One of the plurality of computers, which includes the means for transmitting the information, may be referred to as the "presenter" whereas the other of the computers are referred to as the "attendees". The apparatus provides a shared web browser such that each of the computers displays of the attendees are directed to, or follow, the presenter as he or she moves to various web sites, wherein people in various locations across the world may generally simultaneously interact and conduct a meeting with access to documents without having to be physically located in the same place.

The proposed invention pioneers the concept of a shared-browsing environment, whereby people's browsers can be linked together to create a collaborative working environment. The shared-browser interface is a key element of the ability for people to easily and intuitively share information in a way which is natural for them and therefore presents a minimal learning curve for making the transition from an individual browsing environment to a collaborative working environment.

In order to conduct an interactive, collaborative presentation among a plurality of participants situated at two or more locations each having a computer connected to a network, a website is provided for allowing access to the collaborative presentation. Potential attendees are invited to attend the presentation, either by one of the other attendees or a presentation leader, and may be notified as to the date and time for the presentation. Alternatively, the attendees may be given a unique confirmation number for logging into the presentation. The presentation leader compiles the data or information which is to be viewed by the other attendees, such as by preparing a presentation, or assembling the website addresses where the information is located. When each of the attendees accesses the website according to the identifier information provided in the notification, the collaborative presentation is then initiated by the presentation leader, such that the computer monitors of each of the participants generally simultaneously display the information compiled by the presentation leader. The shared web browser provides additional functionality to the normal web browsers and transforms the conventional web browser to work as if they are aware of each other, i.e., when the leader/presenter uses his or her browser to visit various web sites or "surfs through the net", all the other people who are part of the current conference/session (the attendees) will follow the leader to those web sites.

BRIEF DESCRIPTION OF THE DRAWINGS

There are shown in the drawings certain exemplary depictions of screen displays of the invention as presently preferred. It would be understood that the invention is not limited to the displays shown as examples, and such displays are capable of variations with the scope of the appended claims. In the drawings:

DETAILED DESCRIPTION OF THE PREFERRED EMBODIMENT

Figure 1:
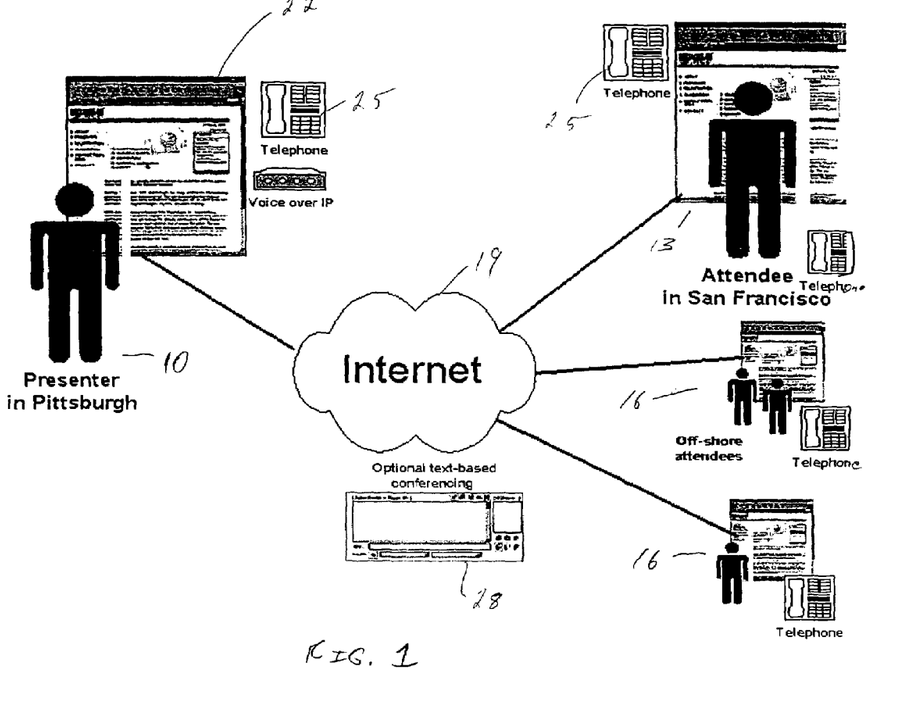
FIG. 1 is a schematic representation of a conference being conducted utilizing the shared web browser of the present invention.

The present invention provides a shared web browser concept whereby an individual person's Internet browser can be linked together with other people's browsers in disparate locations, to create a collaborative working environment even among a plurality of remote locations as represented in FIG. 1. As shown in FIG. 1, a presenter 10 in one location, such as Pittsburgh, Pa., can coordinate with one or more attendees in separate locations, such as a first attendee 13 in San Francisco, Calif. or even off shore attendees 16 in another country around the world. All are interconnected by means of a computer network, such as the Internet 19, and have access to the same visual information by means of the shared web browser 22 of the present invention. It is presently preferred that the shared web browser be used in conjunction with a conventional telephone conference call 25, but may also be used with audio capabilities over the same Internet connection 19. As a feature of the shared web browser 22 of the present invention, optional text-based conferencing 28, as is described more fully hereinafter, is also available for communications between all users, both the presenter 10 and attendees 13, 16 of the presentation.

The shared browser is a key element of the ability for people to easily and intuitively share information in a more natural manner and therefore presents a minimal learning curve for making the transition from an individual browsing environment, as now occurs, to the collaborative working environment of the present invention. The concept behind the design of the shared web browser interface is to leverage the familiarity and experience that all users on the Internet have, with the functionality of existing web browsers such as Netscape Navigator and Microsoft Internet Explorer. The shared web browser 22 adds additional functionality to the conventional web browsers and transforms those browsers to work as if they are all aware of each other, i.e., when the presenter uses his or her browser to "surf" through the Internet, all the other people who are part of the interactive conference or session (i.e., the attendees) will follow the presenter and therefore be looking at the same information as the presenter. Thus, each of the locations has access to the same information at substantially the same time, and are literally on the same web page.

Figure 2:
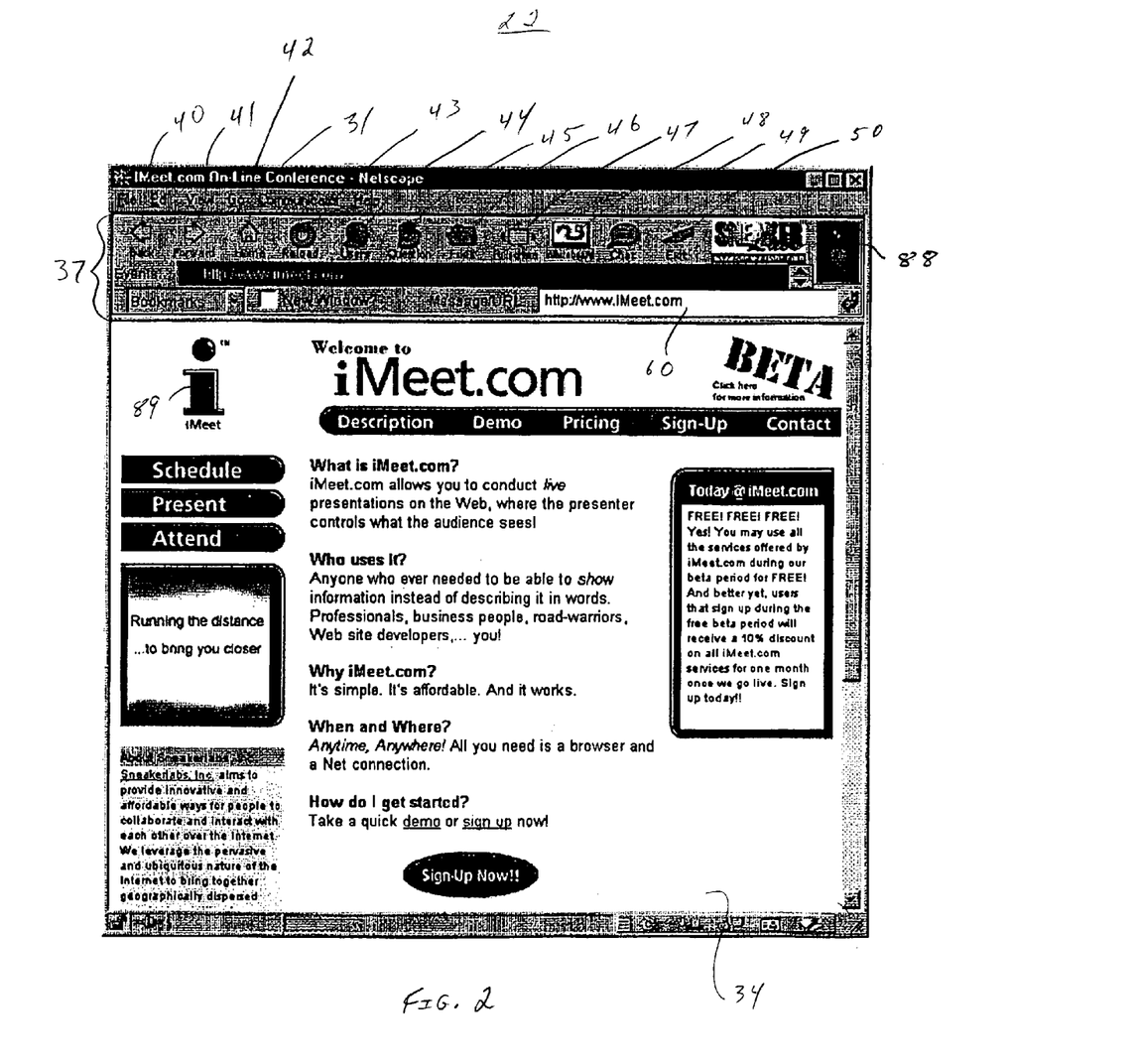
FIG. 2 is a preferred screen display for the presenter's workstation utilizing the shared web browser of the present invention.

The present invention is particularly exemplified by categorizing each of the participants or users of the interactive conference into either a presenter or an attendee. Typically only one person or one location acts as the presenter 10 and all the other participants are attendees 13, 16; however, it is possible for the person acting as the presenter to designate one of the other attendees as the presenter, in order that the person or location actually presents or displays information to all the other members as will be described more fully hereinafter. As shown in FIG. 2, the screen display 31 which is before the presenter or conference leader is shown in the shared web browser interface 22. It is to be understood that the items or documents being presented in the main window 34 of the display 31 can be varied according to the actions of the presenter, as more fully described hereinafter, and display shown in FIG. 2 is by way of example only. Shown across the top of the screen display 31 is a toolbar 37 having numerous buttons 40-50 which correspond to actions which the presenter 10 may initiate in sharing or presenting information to the other attendees 13, 16. Shown in FIG. 2 is the presenter's toolbar 37 which is generated when the browser being used by the presenter is Netscape Navigator. Although it can also be used with Microsoft Internet Explorer, in either case it is important to note that the screen display is very similar to that which originally appears with either Netscape Navigator or Internet Explorer, except for the functions of the specialized buttons 40-50. For example, the back 40, forward 41, home 42 and reload 43 buttons perform substantially the same functions that occur in Netscape Navigator or Internet Explorer. That is, if a person wants to move back or forward between screen displays, to reload the current display or to return to the home location of the interactive website, these buttons perform functions in substantially the same manner as they would with the underlying web browser. However, the remaining buttons that would normally appear with that particular web browser are replaced by the unique button bar interfaces 44-50 for conducting the collaborative presentation, such as those shown in FIG. 2.

In a similar fashion, the lower section 60 of the browser toolbar displays the page of content (URL) which is being accessed by the presenter 10 and which is generally simultaneously displayed on each of the attendees' computer monitor displays. Thus, if the presenter 10 wants to display information from a particular website to each of the attendees, the presenter need merely enter that website location into this lower section 60, press the enter key and the computer monitors for the presenter and each of the attendees will each generally simultaneously display the information contained in that website. Additionally, if the presenter were to activate an embedded link on a particular web site, the attendees would also follow the presenter to that link.

Figure 3:
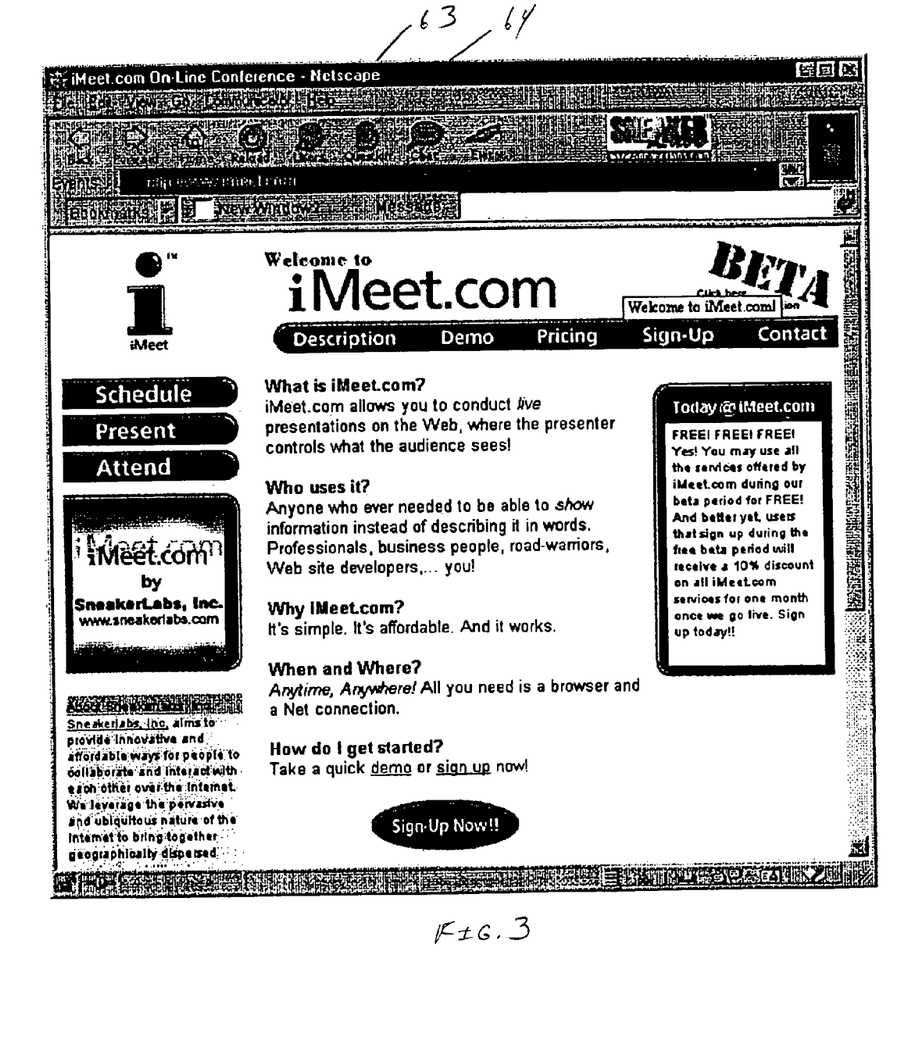
FIG. 3 is a preferred screen display for an attendee's workstation during a conference conducted with the shared web browser of the present invention.

The shared web browser interface 22 that is seen by the attendees 13, 16 in the conference or session looks very similar to the interface for the presenter 10 with the exception that some of the tool bar buttons are removed, disabled or have differing functions. FIG. 3 shows the attendee/participants screen display 63 of the shared browser interface. By way of example, the question button 64 on the user's interface allows that user to notify the presenter that he or she has a question.

Figure 4:
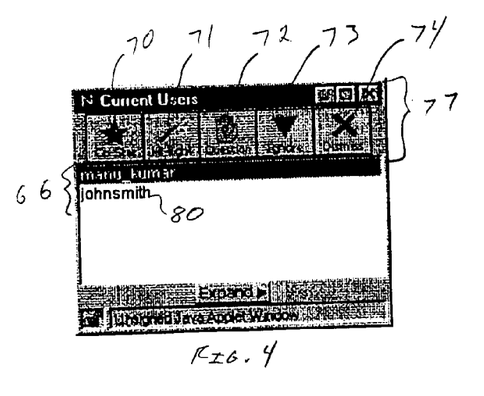
FIG. 4 is a preferred screen display for a user's list window according to one feature of the present invention.

The unique presenters action buttons will now be described in particular detail as they are shown in FIG. 2. The "users" button 44, by being activated by the presenter such as by placing his mouse pointer or other device over this button and clicking on the appropriate mouse button, displays a list of all the users who are currently using the shared browser environment by being logged into the conference or interactive session. FIG. 4 is an example of a user's list 66 and typical screen display which results from clicking on the users button, showing simulated attendee names therein. In the screen display of FIG. 4 for the "users list" window 66, there are five buttons 70-74 on a toolbar 77 which are shown therein. The "co-star" button 70 allows the presenter 10 to designate one of the other attendees 13, 16 to act as the presenter for the interactive session. To do this, the presenter "clicks" once on one of the attendees names listed 80 to highlight it within the window, and then clicks the "co-star" button 70. That attendee then becomes the presenter ("leader") and the prior presenter is an attendee ("follower"). The "highlight" button 71 allows the presenter to change the color of any or all of an attendees text messages, which may be supplied as a question to the presenter, so that the presenter can easily distinguish which of the attendees is asking a question at any particular moment. The "ignore" button 73 allows the presenter to block any messages from any one or all of the attendees so as to prevent text messages from interfering with the presentation then going on. Finally, the "dismiss" button 74 terminates the connection of any of the attendees with the interactive session.

Returning back to the presenter's screen display shown in FIG. 2 for the interactive shared web browser 22, the "question" or "hand raising" button 45 on the presenter's interface toolbar 37 provides the leader/presenter with a visual indication that one or more participants in the conference has a question. When the question button flashes, by clicking on it the presenter will know which person has a question. The "files" button 46 allows the presenter 10 to manage the documents and links which can be shared within the shared browser environment 22. Generally the files button 46 is designed to be used for incorporating into the presentation content from the presenter's PC desktop applications, such as a Microsoft PowerPoint presentation which can be then displayed to each of the attendees 13, 16. When the presenter is showing such a PowerPoint presentation within the shared web browser environment, the presenter has the option to make the presentation into a full screen display mode which will affect all the other participants in the conference, such that their displays will show on their full video monitor screen that presentation, by the presenter clicking on the "full screen" button 47 displayed on the shared web browser toolbar 37 shown on his monitor screen display. When in the full screen mode, each persons display can be changed back to that originally presented within the shared web browser 22 by pressing the escape or "ESC" key on the keyboard to exit from the full screen mode.

Figure 5:
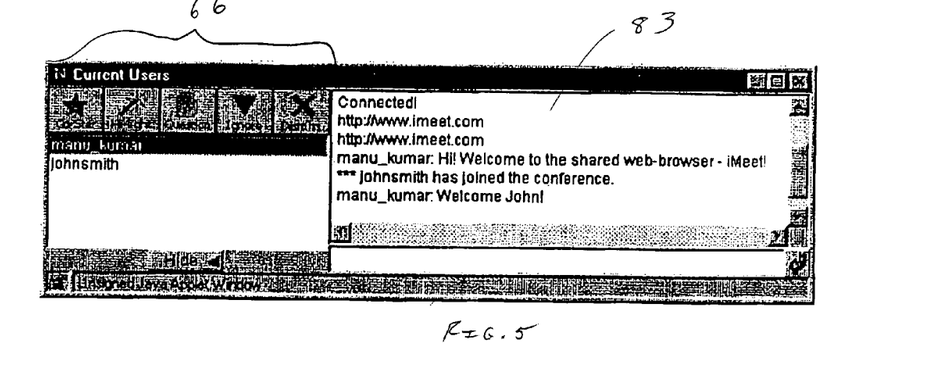
FIG. 5 is a representation of a separate chat window which can be launched for use in the shared web browser of the present invention.

The "white board" button 48 invokes a shared web browser white board which allows users or attendees to modify or draw an additional figure or annotate information that is being displayed collaboratively. This provides an important advantage over traditional telephone and video conferencing methods in which only what is being displayed on a television screen by a presenter can be viewed without making any additions, revisions or corrections as the meeting progresses. Thus, when a design for a component is being discussed, for example, other attendees can make modifications to the design interactively and on a real-time basis rather than having to provide such changes at a later time. The "chat" button 49 invokes a text based communication interface 83 which is shown in FIG. 5. As shown therein, the chat window 83 provides a "sidebar" to the presentation which is visible to each of the attendees in the conference. As can be seen, this chat window 83 is added to the user's list screen display 66 or window shown in FIG. 4. The "exit" button 50 allows the presenter 10 to terminate the session and thereby cause all the participants and attendees to leave the conference or interactive session, as they are "logged out" of the shared web browser 22.

Figure 6:
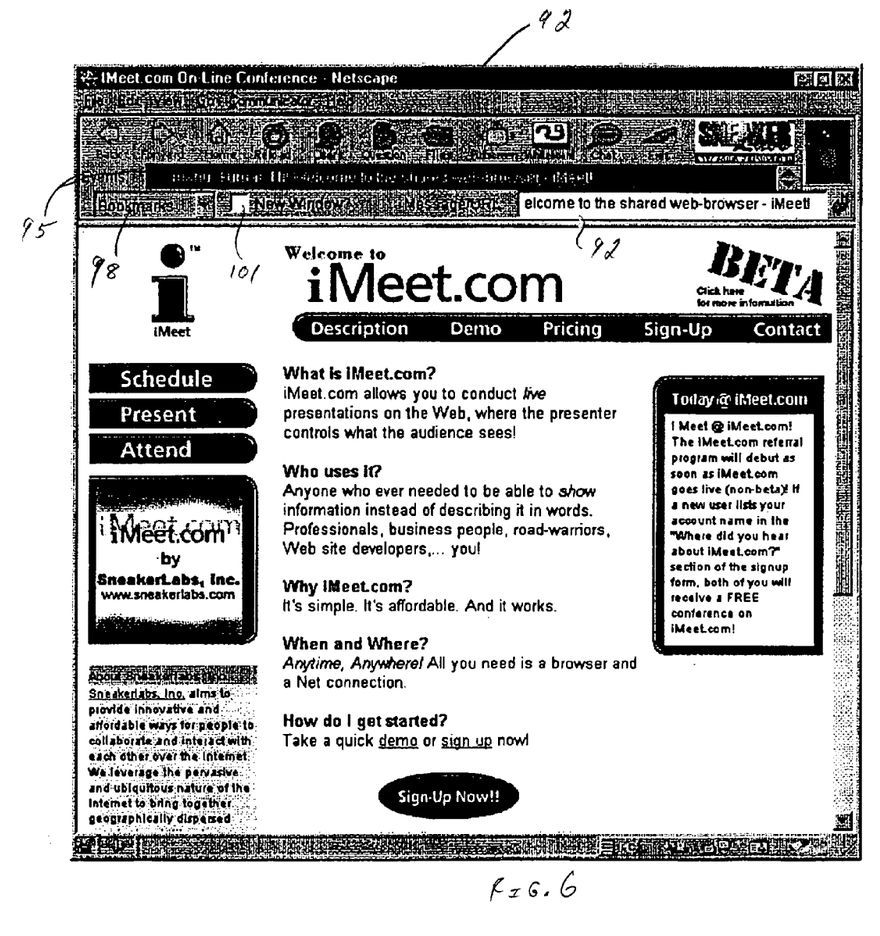
FIG. 6 is a preferred screen display for a microchat feature of the shared web browser of the present invention.

Various other buttons on the presenter's screen also permit information to be simultaneously displayed on each of the other attendee's computers. For example, clicking on a company logo 86 next to the exit button 50 causes the home page of the particular company's website which has initiated the presentation to be displayed as the information content for all the members of the session. Clicking on the iMeet logo 89 displays the iMeet home page as the content for each of the attendees. (By way of explanation "iMeet" is the trade name that the assignee of the present invention has used to designate its shared web browser interface and iMeet.com is the accessing website.) The shared web browser 22 of the present invention also includes a separate component referred to as "microchat" 92, as shown in FIG. 6. The microchat interface allows each participant to type a note in the location/message space. Any text typed in this space shows up as a message from the particular user in a space 95 labeled "Events". If the presenter/leader types a website or URL in the location/message space 92, this will cause all the participants or attendees to follow the leader to that URL website page.

The "bookmarks" lists 98 allows the presenter 10 to invoke any preset URLs or presentations into the conference for all the attendees to use. The "new window" check box 101 launches the content into a new shared web browser window.

In order to conduct a live presentation with anyone, anywhere in the world, each of the prospective users 10, 13, 16 is notified by the presentation leader or presenter 10. This can be done by any of presently available means such as phone message, letter or, preferably, an automated electronic mail message (email). Email has the advantage of also providing an embedded link to the conference within the shared web browser, along with appropriate identification or information for gaining access to the presentation. Such information may include date and time of the presentation, phone number for establishing a telephone conference in conjunction with the presentation, as well as a unique confirmation number or code for participation in the conference.

Prior to the actual presentation, the presenter can prepare the information which is to be generally simultaneously displayed to all the attendees through the shared web browser 22. The information can comprise, for example, a Microsoft PowerPoint presentation, which can be uploaded into the shared web browser, documents generated in a word processing application, or even links to websites on the World Wide Web, which will cause that information to be displayed on the computer monitors of each of the "logged in" attendees. The shared web browser of the present invention automatically converts the information and presentation into a web format for display.

At the designated time for the presentation, each attendee accesses the iMeet.com website and logs into the conference, by inputting the attendees name and entering the confirmation number. The Internet browser in use by the attendee is thereby automatically converted into the shared web browser of the present invention. Regardless of the underlying web browser used by the participants, the screen display is transformed such that while the browser interface looks quite similar, the appropriate button bars of the shared web browser of the present invention are displayed. The users that have been invited to attend the presentation can thereafter view on their individual computer monitors the presentation to be conducted by the leader, since their screen displays are effectively under the control of the presenter.

Once all the attendees are logged into the conference, their Internet browsers are automatically transformed into the shared web browser of the present invention, which allows the presenter to substantially simultaneously display the desired information on each user's computer monitor. Though it is preferred that the present invention be used in conjunction with a conventional telephone conference call, the shared web browser also includes the MicroChat feature which allows attendees to directly communicate with text. The full featured chat window is also available for more text intensive conference. The shared web browser of the present invention also permits attendees to pose questions to the presenter with little or no interruption of the presentation to the other attendees. The presenter thereby has the ability to lead the attendees on a "tour" of any website or information on the Internet simply by "surfing the web" as if he/she were using a conventional web browser. The attendees' browsers remain in sync with the presenter.

In addition to prescheduling a collaborative conference or presentation, a feature referred to as "iMeet Now" of the shared web browser of the present invention allows users to establish an instant web conference for spontaneous, real-time interaction. This provides a much desired avenue for quickly establishing a collaborative session to give a prospective customer a sales presentation, coordinate activities with suppliers or co-workers, or for adding a visual component to a telephone conference call. Each potential attendee need only be notified of the confirmation number for accessing the collaborative session. By initiating a telephone conference with the shared web browser of the present invention, a truly interactive presentation allows the attendees anywhere in the world to focus on the exact portions of the presentation that the presenter wants the attendees to be reviewing at the same time. The presenter controls what each of the attendees sees on their computer monitor.

The present invention provides an effective Internet standards based (HTTP, HTML, Java, Servlets) conferencing solution that runs equally well with virtually any existing hardware, unlike many of the other conferencing products that require a specific hardware and software configuration. The iMeet shared web browser is a low cost solution, reducing the need for expensive and time consuming travel. The present invention also adds more value to existing business models, such as traditional teleconferences and the Internet.

Registering and uploading a presentation takes only a few moments, so presenters can focus on what is really important—the content of their presentation. Presenters can log on at any time prior to the scheduled conference to practice their presentations and learn how to be more efficient and more effective. The shared web browser is as simple to use as a standard browser. One can be an expert after just a few practice sessions.

The present invention offers anytime, anywhere presentations. All each user needs is a computer with a browser. No more global travel to give and attend presentations—just go to your computer and log on. The savings in time, cost and energy are tremendous. It is flexible, displaying whatever one is working on to the people who really need to see it, whether it is a sales presentation of a company's software to a group of bankers in Zurich, or the formula for a new drug that is being developed in conjunction with teams in Boston and San Francisco.

The shred web browser interface can be implemented using two unique methods: Java-applet implementation and plug-in implementation, as described more fully herein.

Java-Applet Implementation:

In this implementation, the shared web browser controls and toolbars are implemented as a Java applet. JavaScript is used to launch the native web browser (such as Netscape or Internet Explorer) with its own toolbars hidden. The browser then loads up a document which contains HTML frames to describe its content. The top frame references a Java-applet. This Java applet is specifically designed to provide the shred browser interface and functionally described above. The Java applet opens a connection to the shared web browser server which is used to manage the interaction between the multiple users within the shared browser environment. Preferably, this host server comprises Bersama technology, which is an industrial-strength client/server infrastructure for building collaborative applications and was developed by the assignee of the present invention. Bersama supports message passing among clients who are registered with a central server. The Bersama client is a lightweight Java class that abstracts away the complexities of low-level socket programming, while remaining a high-performance interface for sending data to the Bersama server and other Bersama clients. When the leader/presenter enters a URL into the Java applet, the applet sends a message to the Bersama server which then broadcasts the location entered by the leader to all the other applets in the same session. Each applet then displays the content of the same page thereby keeping all the users/attendees in sync. In order to detect further clicks on the HTML content itself, all the links in the page are redirected to go through a servlet which can intercept the link selected by the leader and then forward that information through the Bersama server to all of the applets connected to it, thereby maintaining the invariant that all the users are on the same page.

Plug-In Implementation:

In this implementation, the functionality of the native web browser is enhanced by providing a plug-in application such as an ActiveX control for Internet Explorer or a plug-in for Netscape Navigator. The plug-in taps into the browser's internals to keep track of what is the current information being displayed in the browser. It then broadcasts this information to all of the other browsers that are in the same conference/session. This implementation allows the shared web browsers to function in a peer to peer mode, without requiring a central server. The additional functionality provided by this plug-in or ActiveX control makes it possible for any user to become the host for the browser conference.

While specific embodiments of the invention have been described in detail, it will be appreciated by those skilled in the art that various modifications and alternatives to those details could be developed in light of the overall teachings of the disclosure. The description of the shared web browser interface herein is provided as a sample of the interface only and is subject to modifications and improvements. The shared web browser interface of the present invention is a unique and novel approach to bringing highly usable groupware and conferencing to users of the Internet. Accordingly, the particular arrangements disclosed are meant to be illustrative only and not limiting to the scope of the invention which is to be given the full breadth of the following claims, and any and all embodiments thereof.

REFERENCE LIST 10 presenter
13 attendee
16 attendee
19 Internet
22 shared web browser
25 conference call
28 text-based conferencing
31 presenter screen display
34 main window
37 toolbar
40 back
41 forward
42 home
43 reload
44 users
45 question
46 files
47 full screen
48 whiteboard
49 chat
50 exit
60 lower section
63 attendees screen display
66 user's list screen display
70 co-star button
71 highlight button
72 question button
73 ignore button
74 dismiss button
77 user's list toolbar
80 attendee's list
83 text-based communication interface
86 logo
89 iMeet logo
92 microchat
95 events space
98 bookmarks
101 new window check box

The invention claimed is:

1. An apparatus for interactive communications over a network among participants of a single conference at a plurality of locations, the apparatus comprising:
   a leader computer operatively connected to the network;
   a computer readable storage device accessible by the leader computer, the storage device including:
   computer instructions for receiving and displaying information from the network;
   computer instructions for transmitting the information to a plurality of other computers over the network, wherein said other computers each generally simultaneously display the transmitted information; said computer instructions for transmitting comprising a shared web browser to allow the leader to surf through the Internet and to cause said other computers to follow the leader through the Internet, wherein various combinations of shared web browsers can be used for the leader and the other computers; and
   computer instructions for receiving additional information entered in a shared web browser white board from at least one of the other computers over the network, wherein said other computers and said leader computer each generally simultaneously display the additional information in the shared web browser white board, and wherein the additional information is entered by a user of a computer from the plurality of other computers to be associated with the already displayed information; and
   computer instructions for receiving text-based conferencing information from at least one of the other computers over the network, wherein said other computers and said leader computer each generally simultaneously display the text-based conferencing information in a shared web browser window separate from the white board, thereby not altering the information displayed in the shared web browser and the shared web browser white board,
   wherein the leader and the other computers are participating in no more than one conference simultaneously,
   wherein said computer instructions for transmitting information to each of the other of said plurality from the one of said plurality of computers comprises a presenter interface, the presenter interface further comprising computer instructions for communicating with each of the other of said plurality of computers and for causing the identical transmitted information to be generally simultaneously displayed on said other computers, wherein the shared web browser displayed by the lead computer and the other computers in the single conference are different based on the tool bar buttons on the other computers have different functions, wherein at least one tool bar button is an interactive indicator.

2. The apparatus as recited in claim 1, wherein the network comprises the Internet.

3. The apparatus as recited in claim 1, wherein said computer instructions for receiving and displaying information from the network comprises a web browser.

4. The apparatus as recited in claim 1, further comprising computer instructions for transmitting comments or questions from any one or more of the plurality of other computers to the leader computer.

5. The apparatus as recited in claim 1, further comprising computer instructions for assigning different color to the text-based conferencing information received in the leader computer of each of the plurality of other computers to identify origination of the text-based conferencing information.

6. The apparatus as recited in claim 1, further comprising computer instructions for blocking the text-based conferencing information forwarded from any one or more of the plurality of other computers.

7. The apparatus as recited in claim 1, further comprising computer instructions for terminating, from the leader computer, a connection of any one or more of the plurality of other computers from the network.

8. A method of conducting a collaborative presentation among a plurality of participants of a single conference situated at two or more locations, wherein each of said participants has a computer operatively connected to a computer network, the method comprising:
   a) providing a website on the computer network for said participants to obtain access to the collaborative presentation;
   b) sending a message to each of said plurality of participants, the message providing an identifier means for accessing the collaborative presentation;
   c) providing information to be displayed on each of said participants' computers during the collaborative presentation;
   d) accessing the website according to the identifier means;
   e) initiating the collaborative presentation by a leader of said plurality of participants of a single conference presenting the information on the leader's computer, wherein a main window of a display of the computer of each of the other of said plurality of participants displays identical information generally simultaneously as the presented information on the leader's computer;
   f) interactively adding information associated with the presented information by one of the other of said plurality of participants in a shared web browser white board, wherein the computer of each of said participants generally simultaneously displays the additional information in the shared web browser white board;
   g) sharing a web browser of one of said plurality of participants with each of the other of said plurality of participants of a single conference, so that the shared web browser causes the plurality of participants to collectively surf through the Internet according to web sites selected by the leader on the leader's computer; and
   h) initiating the leader's designation of one of the other of said plurality of participants as a new leader, wherein a presentation of information, or a selection of a web site, on the new leader's computer causes the information presented, or web site selected, on the new leader's computer to be generally simultaneously displayed on the computer of each of the other of said plurality of participants, wherein the screen display in the interface is exchanged between leader computer and the new leader computer.

9. The method of conducting a collaborative presentation among a plurality of participants as recited in claim 8, further including the step of initiating a telephone conference call while conducting the collaborative presentation.

10. The method of conducting a collaborative presentation among a plurality of participants as recited in claim 8, wherein said identifier means comprises one or more of a confirmation number, and a scheduled date and time for accessing the collaborative presentation.

11. The method of conducting a collaborative presentation among a plurality of participants as recited in claim 8, further including the step of initiating display of a list of all of the plurality of participants.

12. A method of conducting a collaborative presentation among a plurality of participants of a single conference situated at two or more locations, wherein each of said participants has a computer operatively connected to a computer network, the method comprising:
   a) providing a website on the computer network for said participants to obtain access to the collaborative presentation;
   b) providing information to be displayed on each of said participants' computers during the collaborative presentation;
   c) providing means for said participants to access the website;
   d) initiating the collaborative presentation by one of said plurality of participants of the single conference presenting the information on the one of said participants' computers, wherein a main window of a display of the computer of each of the other of said plurality of participants of the single conference is identical and generally simultaneously displays the information;
   e) interactively adding information associated with the presented information by one of the other of said plurality of participants in a shared web browser white board, wherein the computer of each of said participants generally simultaneously displays the additional information in the shared web browser white board; and
   f) initiating a text-based conferencing by one of the other of said plurality of participants, wherein the computer of each of said participants generally simultaneously displays the text-based conferencing information in a shared web browser window separate from the white board, thereby not altering the information displayed in the shared web browser and the shared web browser white board, wherein the shared web browser displayed by the one of said plurality of participants and the other of said plurality of participants in the single conference are different based on the tool bar buttons on the other of said plurality of participants have different functions, wherein at least one tool bar button is an interactive indicator.

13. A method of conducting a conference among a plurality of participants of a single conference situated at two or more locations over a computer network, the method comprising:
   a) providing a website on the computer network;
   b) providing computer instructions for said participants to access the website via a computer having a display;
   c) providing a share browser interface for conducting the conference, wherein various combinations of shared browser can be used for a leader and the other computers;
   d) operably connecting each said participants' computers of the single conference such that the display of each of said participants generally simultaneously displays the shared browser interface having identical information in a main window;
   e) providing a white board to allow each participant to enter additional information associated with the display of the shared browser interface, the additional information being displayed in the white board, thereby not altering the display of the shared browser interface; and
   f) initiating designation in the leader computer of one of the plurality of other computers as a replacement leader computer, wherein a presentation of information on, or a selection of a web site in the new leader computer causes the information presented on, or web site selected in, the replacement leader computer to be generally simultaneously displayed on the computer of each of the plurality of other computers, including the leader computer, wherein the screen display in the interface is exchanged between leader computer and the replacement leader computer.

14. The method as recited in claim 13 further including the step of categorizing said participants into one of a presenter participant or an attendee participant, such that the presenter participant's computer controls each of said attendee participant's computers via the browser interface.

15. An apparatus for conducting a single conference among a plurality of participants situated at two or more locations over a computer network, the apparatus comprising:
   a) a server computer on the computer network having a website;
   b) computer instructions for said participants to access the website via a computer having a display;
   c) a shared browser interface for conducting the conference, wherein various combinations of shared web browsers can be used for a leader and the other computers, wherein the shared web browser displayed by the lead computer and the other computers in the single conference are different based on the tool bar buttons on the other computers have different functions wherein at least one tool bar button is an interactive indicator;
   d) computer instructions for operably connecting each of said participants' computers of the single conference such that the display of each of said participants generally simultaneously displays the shared browser interface wherein the browser has a main window which consists of identical information for each participant of the conference; and
   e) computer instructions providing a white board to allow each participant to enter additional information associated with the display of the shared browser interface, the additional information being displayed in the white board, thereby not altering the display of the shared browser interface, and computer instructions providing a text based communication interface in a separate shared browser window, thereby not altering the display in the shared browser interface or in the whiteboard, to allow each participant to initiate and participate in text-based conferencing during the conference.

16. An apparatus for interactive communications over a network among participants at a plurality of locations, the apparatus comprising:
   a plurality of computers operatively connected to a network, wherein each of the plurality of computers includes a computer readable storage device comprising:
   computer instructions providing user designation of any one of the plurality of computers as lead computer;
   computer instructions for receiving and displaying information from the network; and
   computer instructions for transmitting to other of the plurality of computers, as lead computer, information received and displayed from the network, wherein the other of the plurality of computers each generally simultaneously display the identical transmitted information, as the lead computer, and wherein the computer instructions for transmitting comprises a shared web browser allowing the other of the plurality of computers to follow the leader through the Internet,
   computer instructions for initiating designation in the lead of one or the plurality of other computers as a replacement leader computer, wherein a presentation of information on, or a selection of a web site in, the new lead computer causes the information presented on, or web site selected in, the replacement lead computer to be generally simultaneously displayed on the computer of each of the plurality of other computers, including the lead computer, wherein the screen display in the interface is exchanged between lead computer and the replacement lead computer,
   wherein various combinations of shared web browsers can be used for the leader and the other computers.

17. The apparatus as recited in claim 16, wherein the network comprises the Internet.

18. The apparatus as recited in claim 16, wherein the computer instructions for transmitting comprises a presenter interface that includes computer instructions for communicating with each of the other of the plurality of computers and for causing information to be generally simultaneously displayed on the other of the plurality of computers.

19. The apparatus as recited in claim 16, further comprising computer instructions for receiving additional information entered in a shared web browser white board from at least one of the other of the plurality of computers over the network, wherein the other of the plurality of computers and the leader computer each generally simultaneously display the additional information in the shared web browser white board, and wherein the additional information is entered by a user of a computer from the other of the plurality of computers.

20. The apparatus as recited in claim 19, further comprising computer instructions for receiving text-based conferencing information from at least one of the other of the plurality of computers over the network, wherein the other of the plurality of computers and the leader computer each generally simultaneously display the text-based conferencing information in a shared web browser window separate from the white board, thereby not altering the information displayed in the shared web browser window and the shared web browser white board.

21. The apparatus as recited in claim 20, further comprising computer instructions for assigning different color to the text-based conferencing information received, the color identifying origination of the text-based conferencing information.

22. The apparatus as recited in claim 20, further comprising computer instructions for blocking the text-based conferencing information forwarded from any one or more of the other of the plurality of computers.

23. The apparatus as recited in claim 16, further comprising computer instructions for initiating designation of one of the other of the plurality of computers as a replacement leader computer, wherein a presentation of information on, or a selection of a web site in, the replacement leader computer causes the information presented, or the web site selected, to be generally simultaneously displayed on each of the other of the plurality of computers.

24. The apparatus as recited in claim 16, further comprising computer instructions for transmitting comments or questions from any one or more of the other of the plurality of computers to the leader computer.

25. The apparatus as recited in claim 16, further comprising computer instructions for terminating, from the leader computer, a connection of any one or more of the other of the plurality of computers from the network.

* * * * *